United States Patent [19]

Lauffenburger et al.

[11] Patent Number: 4,794,470

[45] Date of Patent: Dec. 27, 1988

[54] SECURITY SYSTEM FOR PROTECTING INFORMATION

[75] Inventors: James H. Lauffenburger, Colorado Springs; George F. Denehy; Andre Novickis, both of Monument, all of Colo.

[73] Assignee: Media Security Incorporated and Associates, Colorado Springs, Colo.

[21] Appl. No.: 916,891

[22] Filed: Oct. 9, 1986

Related U.S. Application Data

[63] Continuation-in-part of Ser. No. 878,320, Jun. 25, 1986, abandoned.

[51] Int. Cl.⁴ .................. G11B 19/10; G11B 23/033; G11B 23/027; G08B 13/24
[52] U.S. Cl. .................................. 360/69; 360/60; 360/132; 360/133; 340/572; 206/313; 206/807
[58] Field of Search .............. 206/312, 444, 389, 459, 206/387, 313, 807; 360/15, 60, 132, 133, 69, 137; 235/382, 382.5, 450, 492, 493; 340/561, 572, 825, 825.31, 825.32, 825.34, 825.3, 571, 551; 242/197-200

[56] References Cited

U.S. PATENT DOCUMENTS

| Re. 32,296 | 11/1986 | Wynalda | 206/387 |
|---|---|---|---|
| 3,967,161 | 6/1976 | Lichtblau | 340/572 |
| 4,074,249 | 2/1978 | Minasy | 340/572 |
| 4,075,618 | 2/1978 | Monteau | 360/132 |
| 4,263,634 | 4/1981 | Chenoweth et al. | 360/133 |
| 4,353,064 | 10/1982 | Stamm | 340/825.31 |
| 4,471,343 | 9/1984 | Lemelson | 340/571 |
| 4,555,077 | 11/1985 | Platter et al. | 206/389 |
| 4,665,387 | 5/1987 | Cooper et al. | 340/572 |
| 4,673,923 | 6/1987 | Boscoe et al. | 340/572 |
| 4,691,202 | 9/1987 | Denne et al. | 235/382 |
| 4,692,746 | 9/1987 | Budin et al. | 340/572 |

FOREIGN PATENT DOCUMENTS

| 3212039 | 10/1983 | Fed. Rep. of Germany | 340/572 |
|---|---|---|---|
| 85/02696 | 6/1985 | PCT Int'l Appl. | 340/825.31 |
| 2154350 | 9/1985 | United Kingdom | 340/572 |

Primary Examiner—Raymond F. Cardillo
Assistant Examiner—Steven R. Garland
Attorney, Agent, or Firm—Klaas & Law

[57] ABSTRACT

A system for providing a security capability for an electronic information reproducing device mounted within a housing, such as a floppy disk mounted in a jacket or a tape in a 3480 tape cartridge, by attaching an electronic surveillance tag to an inner surface of the housing during its manufacture so that the electronic surveillance tag cannot be easily removed from within the floppy disk or 3480 tape cartridge without destroying it and is not visible from outside of the housing and an electronic drive means having an electronic circuit for detecting the presence or absence of an electric surveillance tag and generating a signal in response to such presence or absence.

15 Claims, 5 Drawing Sheets

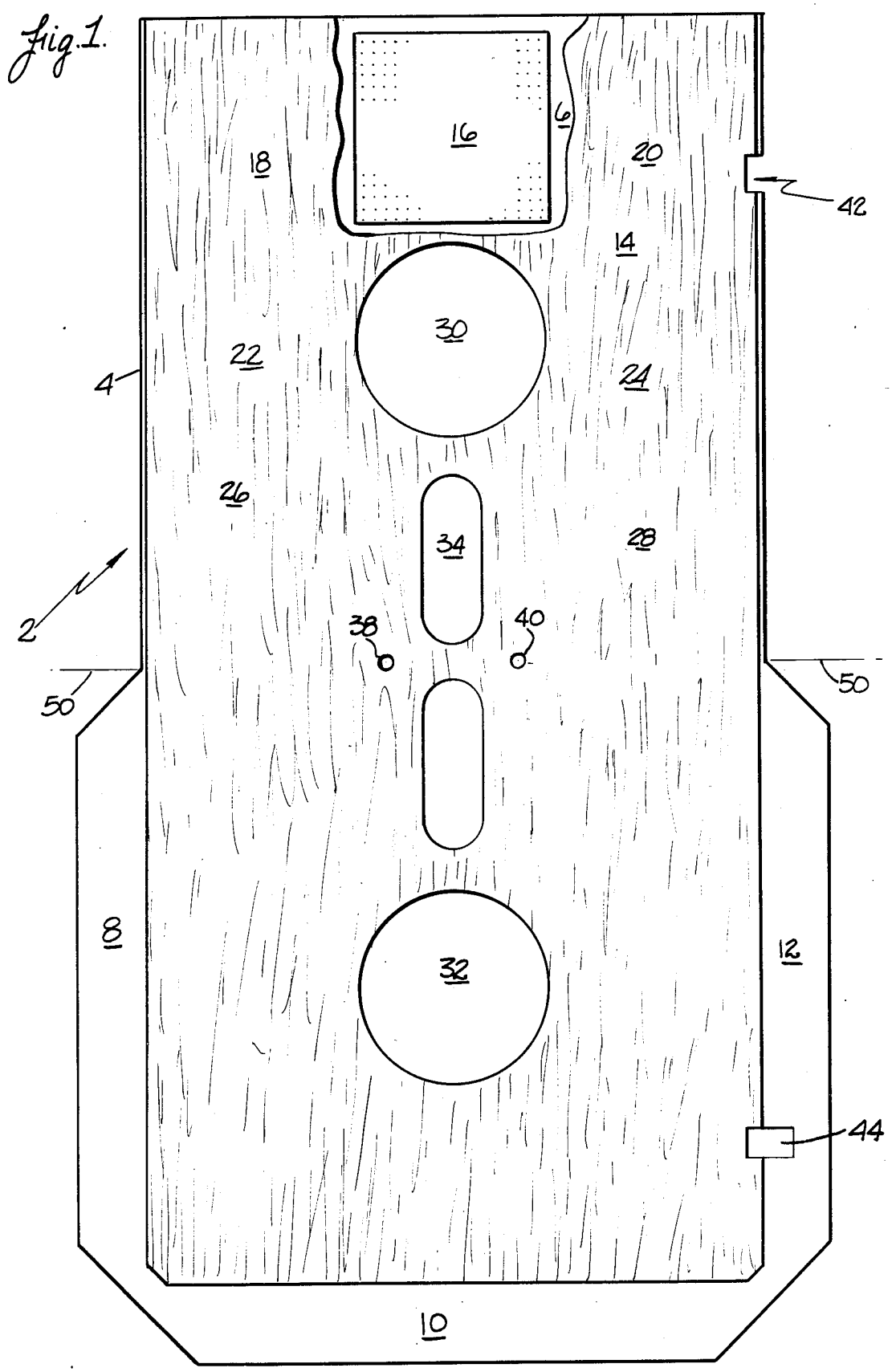

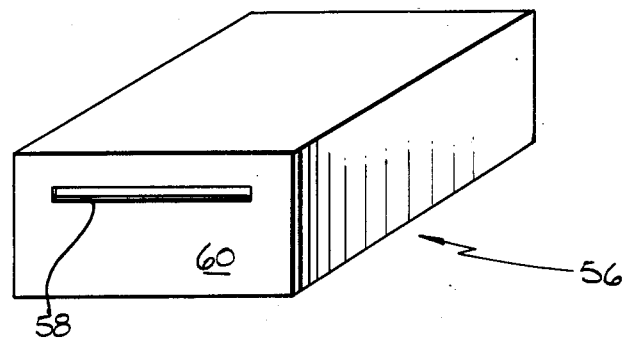
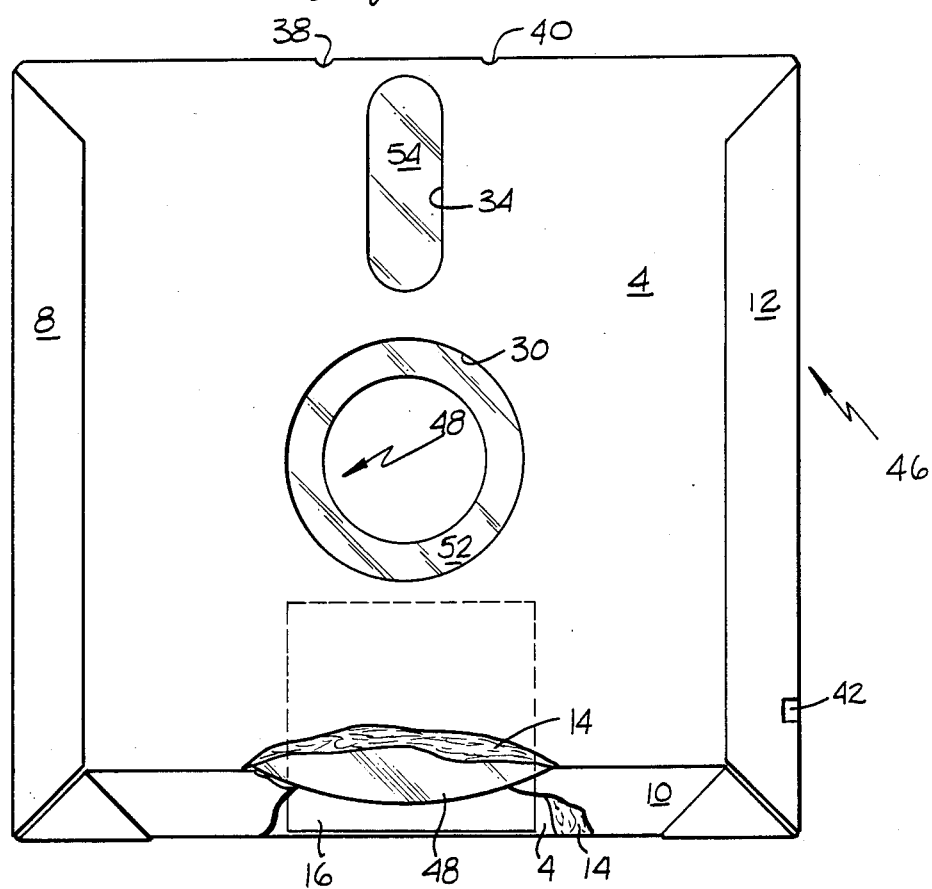

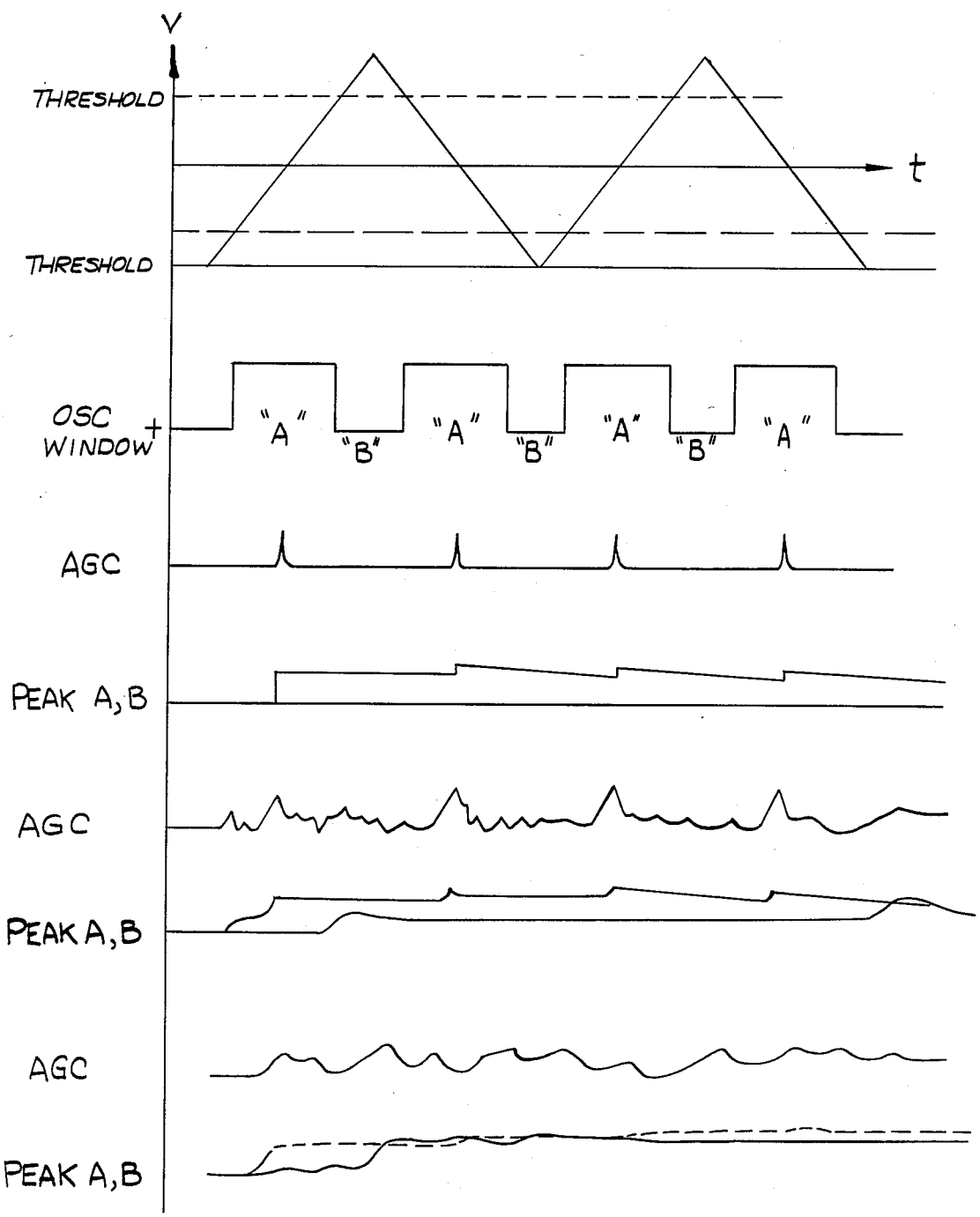
Fig. 4. (SYNCRONOUS DISCRIMINATION)

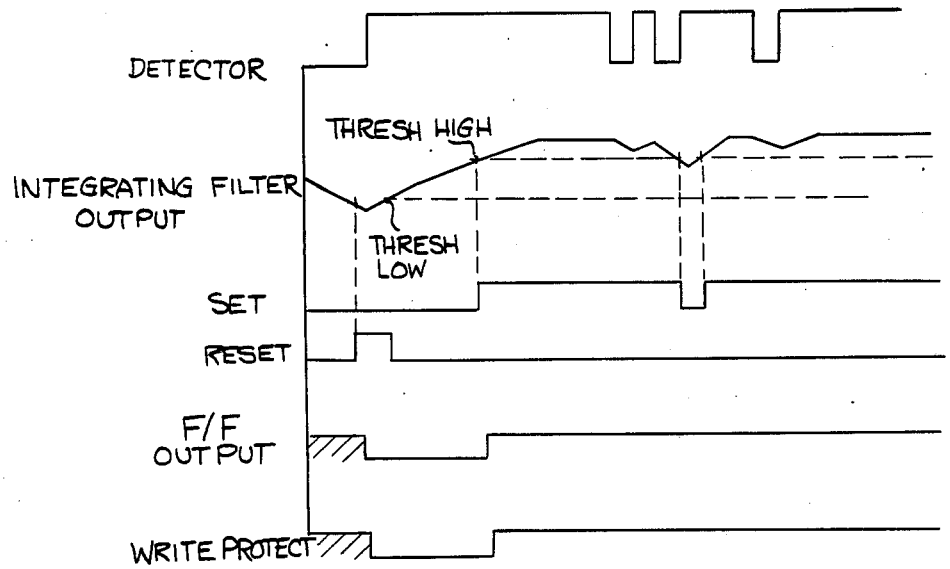
Fig. 5 (INTEGRATED FILTER ACTION AND OUTPUT)
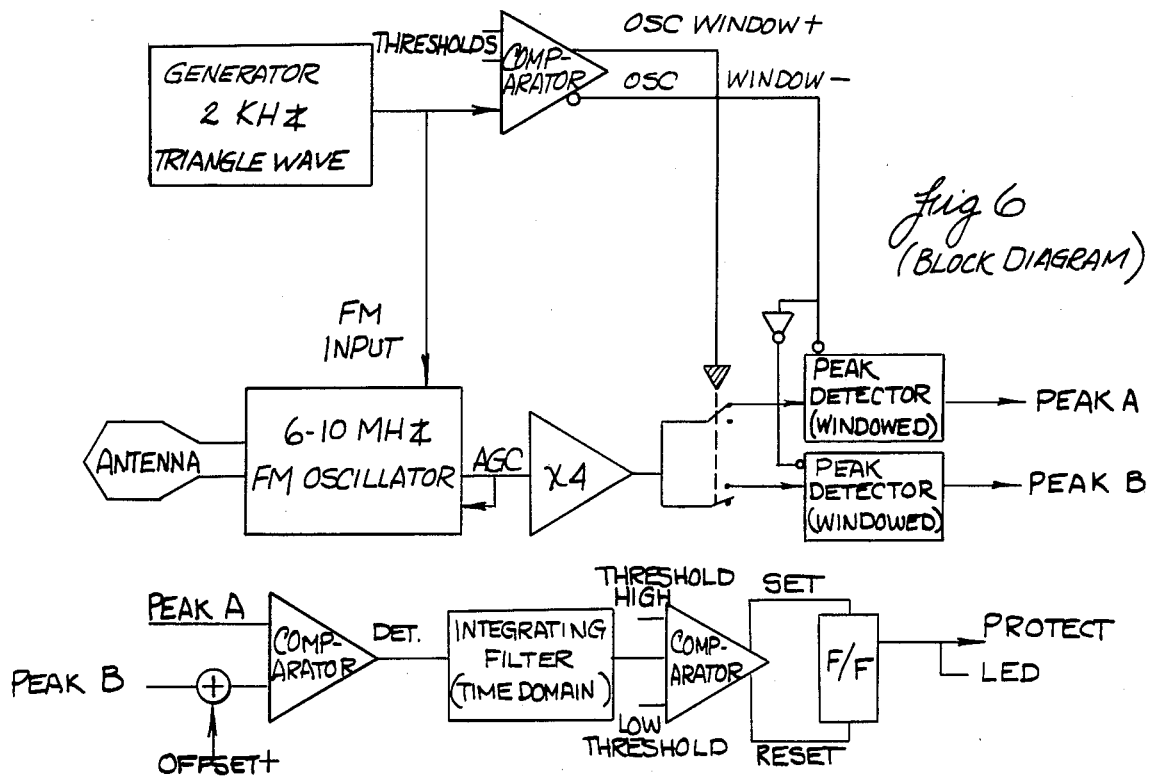
Fig. 6 (BLOCK DIAGRAM)

4,794,470

SECURITY SYSTEM FOR PROTECTING INFORMATION

This application is a continuation-in-part of application Ser. No. 878,320 filed June 25, 1986 now abandoned.

FIELD OF THE INVENTION

This invention relates generally to a security system of the type that uses an electronic surveillance tag that is attached to an article wherein the presence of the electronic surveillance tag is readily detected by an electronic circuit to generate an electric signal and more particularly to such a system wherein the electronic surveillance tag is incorporated within an electronic information reproducing device at the point of manufacture so that the electronic surveillance tag is not readily visible or easily removed and the electronic surveillance tag also functions to prevent normal operation of an electronic information reproducing device not provided with an electronic surveillance tag and to produce a signal to alert security personnel.

BACKGROUND OF THE INVENTION

With the proliferation of the personal computer (PC) in the workplace, control of the security of computer software and the data contained in the software floppy disks has become a problem of major proportions. Attempts at encryption of the data or use of password systems to prevent unauthorized access to the data contained in the floppy disks has to date proven to be ineffective. Information has continued to be pirated and bootlegged by breaking the encryption codes through the use of yet another computer program. Non-encrypted data has simply been copied and removed from the premises to be exploited or released by the perpetrator. These losses of information have also been aggravated by the outright theft of the floppy disks themselves. Thus the control of the release of information as well as the actual theft of the floppy disk upon which the information is stored has presented a continuous problem to information and data security managers. To date no suitable solution has been found which would provide real-time/hands-on control of the data filled floppy disk. Due to the high transportability and easy concealment of the floppy disk, the job of control and detection of the presence of the floppy disk is virtually impossible without extraordinary measures such as detailed body and briefcase searches by security personnel. Such activities within the office working environment are not well received and create major problems.

These problems are also present in relation to the 3480 tape cartridges, marketed by numerous media manufacturers such as IBM, which are presently being introduced as a replacement for the conventional 2400 foot one half inch reel to reel tapes for large mainframe computers. A feature of the 3480 tape cartridge is that it can contain ten times the information normally contained on one 2400 foot reel of conventional tape. The large storage capacity of this tape cartridge is a major asset of this product as well as a major deficiency. Due to its small size, high transportability and voluminous capacity for storage, it is a major information security liability.

BRIEF DESCRIPTION OF THE INVENTION

This invention provides a security system for protecting information contained in an electronic information reproducing device such as a floppy disk or a 3480 tape cartridge. In one embodiment, the invention provides a security system for a floppy disk wherein an electronic surveillance tag is mounted inside the jacket in which the floppy disk is enclosed so that no portion of the electronic surveillance tag is visible. In another embodiment, an electronic surveillance tag is mounted inside a 3480 tape cartridge so that no portion of the electronic surveillance tag is visible. The electronic surveillance tag comprises an electronic IC circuit. Also, this invention provides an electronic circuit within the drive means for enabling or disabling the use of the electronic information reproducing device in the electronic drive means depending on the presence or absence of the electronic surveillance tag therein.

In one embodiment of the invention, a jacket blank for holding a floppy disk comprises a generally rectangular flat sheet of jacketing material having a plurality of integral flaps extending outwardly from portions thereof. A generally rectangular liner having a low coefficient of friction is superposed over the rectangular portion of the sheet of jacketing material. A plurality of cut-outs are made in the sheet of jacketing material and the superposed liner to provide for access to a floppy disk. An electronic surveillance tag is mounted between a portion of the sheet of jacketing material and a portion of the superposed liner. The sheet of jacketing material and the superposed liner are folded in half and then two of the flaps are folded over and sealed to the sheet of jacketing material. A floppy disk is inserted into the jacket between portions of the liner and the remaining flap is folded over and sealed to the jacketing material so that the diskette is enclosed within the jacket and no portion of the electronic surveillance tag is visible. The jacketed floppy disk is inserted into a drive means which has an electronic circuit to detect the presence or absence of the electronic surveillance tag. If no electronic surveillance tag is detected, the electronic circuit can control access to specific portions of the computer to prevent operation thereof and produce a signal which can alert security personnel.

In another embodiment of the invention, an electronic surveillance tag is installed inside an electronic infomation reproducing device such as a 3480 tape cartridge at the point of manufacture. The electronic surveillance tag is located so that its presence can not be detected by an outside visual inspection of the tape cartridge nor easily removed without the destruction of the cartridge case. The electronic surveillance tag functions in a normal mode of detecting any attempt to remove the tape cartridge from a given location. In normal use at a given location, a tape cartridge is inserted into a computer drive mechanism which has an electronic circuit to detect the presence or absence of the electronic surveillance tag. If no electronic surveillance tag is detected, the electronic circuit can control access to prevent the normal use of the tape cartridge and produce a signal which can alert security personnel of the attempted use of a tape cartridge without the electronic surveillance tag.

It is an object of this invention to provide a covert system for the protection of information contained on electronic information reproducing devices.

It is another object of this invention to provide a security system to prevent the misappropriation of the floppy disk itself and/or the information it contains.

It is a further object of this invention to provide a security system to prevent the misappropriation of the 3480 tape cartridge itself and/or the information it contains.

Additional objects, advantages, and novel features of the invention are set forth in part in the description which follows which will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWING

FIG. 1 is a top plan view of a jacket blank of this invention;

FIG. 2 is a top plan view of a closed jacket of this invention having a floppy disk located therein;

FIG. 3 is a pictorial view of a floppy disk drive means;

FIG. 4 is a graphic representation of a profile of AGC voltages generated by the circuits of the present invention;

FIG. 5 is a graphic representation of the operation of the integrated filter action and resulting control;

FIG. 6 are block diagram representations of the circuits used in the present invention;

DETAILED DESCRIPTION OF THE INVENTION

Figure 7:
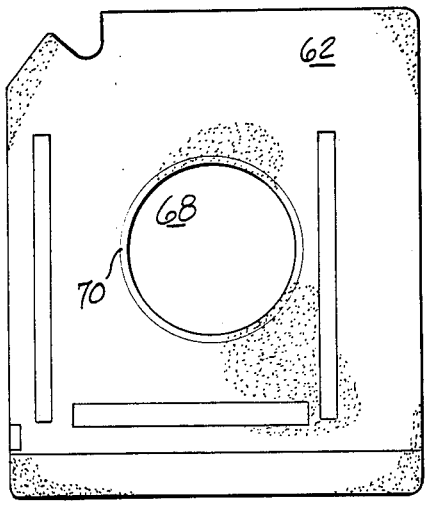
FIG. 7 is an outside plan view of one portion of a 3480 tape cartridge.

In FIG. 1, there is illustrated a jacket blank 2 of one modification of the invention. The jacket blank 2 has a flat sheet 4 of jacketing material having a generally rectangular portion 6 and three integral flaps 8, 10 and 12 extending outwardly from portions thereof. A generally rectangular flat liner 14 of a material having a low coefficient of friction is superposed over the generally rectangular portion 6 of the flat sheet 4 of jacketing material. The generally rectangular flat liner 14 is secured to the flat sheet 4 of jacketing material by suitable means, such as an adhesive.

An electronic surveillance tag 16 is positioned between a portion of the flat sheet 4 of jacketing material and a portion of the generally rectangular flat liner 14. The electronic surveillance tag 16 is of a conventional nature and may comprise an inductive-capacitive circuit such as that marketed by Check-Point Incorporated. In the modification illustrated in FIG. 1, the electronic surveillance tag 16 is located in the upper central portion of the jacket blank 2. There are seven locations on the modification illustrated in FIG. 1 where the electronic surveillance tag 16 may be located such as the upper left 18 or right 20 locations, the middle left 22 or right 24 locations and the lower left 26 or right 28 locations. The electronic surveillance tag 16 may be secured to either the flat sheet 4 of jacketing material or the generally rectangular flat liner or to both by suitable means, such as an adhesive.

Circular openings 30 and 32 are formed in the jacket blank 2 to provide for the exposure of the central portion of a floppy disk as described below. Oblong openings 34 and 36 are formed in the jacket blank 2 to provide for the exposure of the information portion of a floppy disk as described. Information openings 38 and 40 and 42 and 44 are also formed in the jacket blank 2.

A closed jacket 46 having a floppy disk 48 enclosed therein, illustrated in FIG. 2, is formed by first folding the jacket blank 2 substantially in half around the fold line 50. Flaps 8 and 12 are then folded over portions of the flat sheet 4 of jacketing material and secured thereto by suitable means, such as an adhesive, to form a jacket. A floppy disk 48 is inserted into the jacket between portions of the generally rectangular liner 14. The flap 10 is then folded over portions of the flat sheet 4 of jacketing material and secured thereto by suitable means, such as an adhesive. The floppy disk 48 has a central portion 52 exposed through the circular openings 30 and 32 and adapted to be grasped by the drive means described below. The floppy disk 48 also has information means 54 exposed through the oblong openings 34 and 36.

A conventional floppy disk drive means 56 is illustrated in FIG. 3. The drive means 56 is generally boxlike and has a rectangular opening 58 in an end wall 60 through which a closed jacket 46 having a floppy disk 48 enclosed therein may be inserted. The drive means 56 has an electronic circuit, described below, mounted therein for detecting the presence or absence of an electronic surveillance tag 16.

The purpose of the electronic circuit contained in the disk drive mechanism (shown in block diagram in FIG. 6) is to detect the special disk described herein. A conventional floppy disk drive is modified to contain an electronic circuit and a sense antenna which can detect the presence of the tag or circuit placed in the envelope for the magnetic disk media. The tag contains a resonant circuit which preferably is small and lossy. In the embodiment described, the tag circuit is designed to be resonant at preferably about 8 MHz. The circuit contained in the disk drive preferably contains an FM oscillator which is connected to an antenna (FIG. 6) which acts as the inductor in a resonant tank circuit. The other component of the tank circuit is a voltage variable capacitor or varactor. By providing specific adjustment of the voltage on the capacitor of the tank circuit, the FM oscillator can be made to oscillate preferably between 6 MHz and 10 MHz. In the embodiment described, the circuit also contains a second oscillator which preferably is designed to generate a triangular wave form at a frequency of about 2 kHz. This signal is used to drive the varactor in the FM oscillator, as shown in FIG. 6. As the triangle wave ramps up, as shown in FIG. 4, the FM oscillator frequency is increased and conversely the tank frequency decreases as the triangle wave ramps down. By this process, the frequency of the antenna varies directly and synchronously with the triangle wave form, shown in FIG. 6.

The amplitude of the oscillations from the FM oscillator is controlled by an automatic gain control circuit (AGC). Using this design, a voltage proportional to the gain is periodically reached in the circuit during operation.

The tag on the floppy disk, when in proximity to the antenna inside the disk drive mechanism, and when scanned, places an additional load on the FM oscillator which in turn increases gain and increases the voltage signal.

This signal processing design provides for synchronous rises in the AGC voltage which must be detected to verify the presence of a tag. Normally, such designs would employ several stages of differentiation in order to magnify the small voltage changes to detectable levels. Conventional designs, however, increase the the circuits' sensitivity to noise where the environment may produce incorrect signal responses. The present invention incorporates an amplifier 2 kHz with small gain. This first stage of differentiation between signals and noise is extremely important where the environment is characteristically noisy.

The next level of discrimination in the present invention takes advantage of the fact that the circuit can be designed to identify the time when the tag-blip is expected to appear. This should happen at the time the point in the triangular wave corresponds to approximately the 8 MHz output of the FM Oscillator. A comparator connected to the triangle wave generator produces a timing signal, designated as OSC Window+, that indicates where the so-called tag-blip should be. A peak detector connected to the comparator looks for the highest amplitude blip during he time of this window (called peak A in FIG. 6). A second peak detector measures the highest peak during the rest of the triangular cycle; this is called peak B(also in FIG. 6). If there is no tag-blip, then on the average, the highest peak A should be about the same as the highest peak B. A fixed offset is added to peak B. Thus, for the condition of no tag-blip, the final peak B should be larger than peak A. These two levels are compared, and if B is larger, no tag is indicated (by a low on the detector line in FIG. 5).

If there is a tag-blip due to the presence of a diskette containing the resonant circuit in the field of the antenna in the disk drive mechanism, it should add to the noise level during the appropriate time, and peak A should be larger. This will be sensed by the comparator and a tag is indicated (a high on the detector line in FIG. 5).

Since the noise in the circuit is random with respect to the 2 kHz triangular wave, any noise will appear with equal probability as a signal in or out of the peak A window (OSC Window+, FIG. 6). Most noise is of a much higher frequency than 2 kHz, and will therefore be: (1) effectively filtered out of the resultant signal by the low bandwidth of the amplifier; or is (2), present in both the peak A window and the peak B window. If it is present in both windows, it is effectively cancelled out by the peak detectors.

Noise present in the environment of the circuit may cause a mis-triggering of the comparator between peak A and peak B. Thus, on a random basis, the detector line in FIG. 5 will will not show a signal a small percentage of the time. The gain and offset of peak A and peak B should be such that this happens at an infrequent rate. This rate may be as small as one in one hundred samples.

To correct for even this situation, further discrimination is provided by an Integrating Filter, shown in the block diagram in FIG. 6. This filter is designed such that approximately 10 correct samples are required for the final flip/flop to change state. The detector line would then have to report high for about 10 cycles of the 2 kHz triangular wave in order for the circuit to verify detection of the presence of the resonant circuit in the tag. Once detected, the detector line would have to be low for the same amount of time in order for the circuit to change back to a tag not detected state. Thus, this timed discrimination effectively filters out infrequent noise-induced errors.

The final device in the circuit is the flip/flop circuit referred previously and designated as F/F in FIG. 6. This circuit is designed to provide set or reset signals to indicate the presence or absence of the tag in the disk drive according to the signals also previously described. This circuit selectively drives an output transistor whose collector is connected in series to the ground side of the write-protect sensor which is present in any disk drive. If the flip/flop circuit is in the set mode, the transistor allows the write-protect sensor to work normally. If, on the other hand, a tag is not detected, then the flip/flop circuit is retained in the reset mode by the transistor remaining in an high-impedance state, and the floppy drive remains in a write-protected mode. This provides protection against unauthorized entry into a protected system which will frustrate copying, alteration or any other activities which have not previously been authorized. Other outputs can be provided which would alert security personnel that unauthorized entry has been attempted.

Figure 8:
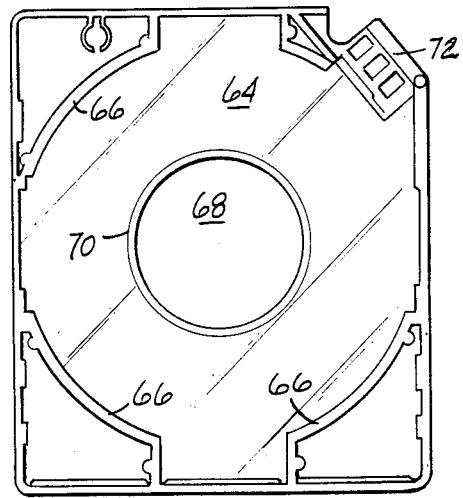
FIG. 8 is an inside plan view of FIG. 7.

In FIG. 7, there is illustrated the outer surface configuration 62 of one portion of a conventional 3480 tape cartridge and in FIG. 8, there is illustrated the inner surface configuration 64 of the same one portion. A plurality of curved inner partitions 66 provide means for properly locating the tape (not shown). A central opening 68 having a beveled sidewall 70 is provided in the one portion. Conventional means 72 are provided for cooperation with the tape in a conventional manner.

Figure 10:
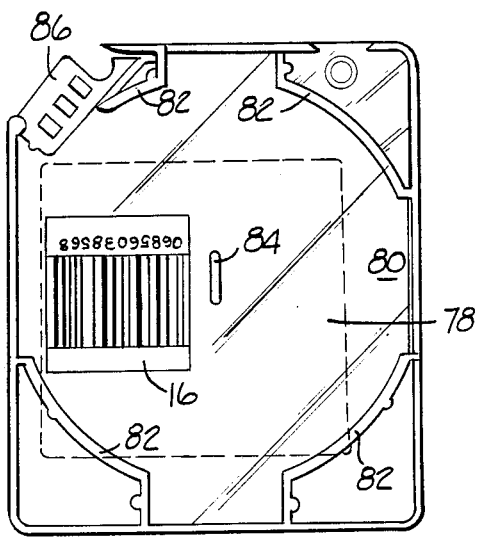
FIG. 10 is an inside plan view of FIG. 9.
Figure 9:
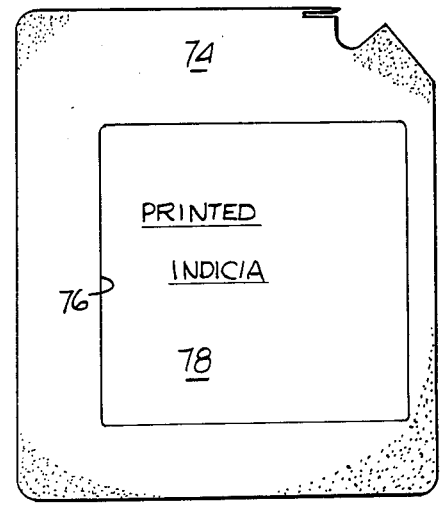
FIG. 9 is an outside plan view of the other portion of a 3480 tape cartridge.

In FIG. 9, there is illustrated the outer surface configration 74 of the other portion of the conventional 3480 tape cartridge. The outer surface configuration 74 has a recessed area 76 in which is secured, by suitable means such as adhesive, an opaque indicia bearing label 78 containing information relating to the tape cartridge. In FIG. 10, there is illustrated the inner surface oonfiguration 80 of the other portion of the tape cartridge. A plurality of curved inner portions 82 and a center stud 84 provide means for locating the tape. Also, conventional means 86 are provided for cooperating with the conventional means 72 in a conventional manner.

An electronic surveillance tag 16, as described above, is secured to the inner surface configuration 80 of the other portion. The electronic surveillance tag 16 is located within the borders of the opaque indicia bearing label 78 so that the electronic surveillance tag 16 is not visible when looking at the outer surface configuration 74. Also, the electronic surveillance tag 16 is within the border defined by the curved inner portions 66 and 82 so that the tape (not shown) prevents observance of the electronic surveillance tag 16 when looking at the outer surface 62. The electronic surveillance tag 16 is applied during the manufacture of the tape cartridge so that the electronic surveillance tag 16 is covertly secured in the 3480 tape cartridge as it is in the floppy disk. In the manufacturing process, an electronic surveillance tag 16 is secured on the inner surface configuration by suitable means, such as an adhesive, at a location as indicate in FIG. 10. A tape is inserted within the border defined by the curved inner portions 82. The one portion is then positioned over the other portion so that the inner surface configuration 64 and 80 are in a facing relationship. The one portion is then permanently secured to the other portion by suitable means, such as an adhesive, so that the tape cartridge may not be opened without detection. Although the invention is described above in relation to floppy disks and 3480 tape cartridges, it is within the spirit of the invention to protect in a covert fashion other types of electronic information reproducing devices.

An electronic circuit, such as that described above, in relation to FIGS. 4-6, will be provided in the computer drive mechanism used with the tape cartridge to detect the presence or absence of the electronic surveillance tag 16. If no electronic surveillance tag 16 is detected, the electronic circuit will prevent operation of the computer drive mechanism and produce a signal to alert security personnel.

It is contemplated that the inventive concepts herein described may be variously otherwise embodied and it is intended that the appended claims be construed to include alternative embodiments of the invention except insofar as limited by the prior art.

What is claimed is:

1. A security system using an electronic surveillance tag which is readily detected by an electronic circuit for preventing unauthorized use or removal of an electronic information reproducing device comprising:
   a housing;
   an electronic information reproducing device contained within said housing;
   and electronic surveillance tag capable of producing a detectable electric signal secured within said housing prior to the sealing thereof so that no portion of said electronic surveillance tag is visible from outside said housing;
   sealing means for sealing said housing after said electronic information reproducing device and said electronic surveillance tag have been placed therein to prevent access into said housing;
   electronic drive means for obtaining information from said electronic information reproducing device; and
   said drive means having an electronic circuit for detecting the presence or absence of said electronic surveillance tag for enabling or disabling the use of said electronic information reproducing device.

2. Apparatus as in claim 1 wherein said housing and said electronic information reproducing device comprises:
   a tape cartridge.

3. Apparatus as in claim 2 wherein said tape cartridge comprises:
   a 3480 tape cartridge.

4. Apparatus as in claim 2 wherein said electronic surveillance tag comprises:
   an inductive-capacitive circuit.

5. Apparatus as in claim 1 wherein said housing and said electronic information reproducing device comprises:
   a floppy disk mounted in a jacket.

6. Apparatus as in claim 1 wherein said comprises:
   a 3480 tape cartridge.

7. Apparatus as in claim 6 wherein said electronic surveillance tag comprises:
   an inductive-capacitive circuit.

8. A security system using an electronic surveillance tag which is readily detected by an electronic circuit for enabling an electronic drive means to differentiate between electronic information reproducing devices inserted into such electronic drive means with or without the electronic surveillance tag and to enable or disable the use of such electronic information reproducing devices comprising:
   an electronic surveillance circuit mesans including resonant circuit means capable of acting as the inductor in a resonant tank circuit;
   said electronic surveillance circuit means being associated with an electronic information reproducing device to be secured; and
   electronic circuit means for reading the proximity and presence of said electronic surveillance circuit means, said electronic circuit means including:
   frequency modulated oscillator means for producing an output comprising a range of frequencies which include the resonant frequency of said electronic surveillance circuit means;
   antenna means connected to said frequency modulated oscillator means responsive to the presence of said electronic circuit means to increase the voltage output of said frequency modulated oscillator means at said resonant frequency;
   automatic gain control means for producing a signal indicative of the voltage from said frequency modulated oscillator means;
   a fixed frequency triangular wave generator, whose frequency is selected to be outside the range of frequencies produced by said frequency modulated oscillator means, connected to the input of said frequency modulated oscillator means and to a comparator circuit means;
   said comparator circuit means produces a signal to a first peak detector means at the time when said antenna will be responding to the presence of said electronic surveillance circuit means so that said first peak detector means receives a signal from said automatic gain control means;
   said first peak detector means producing an output signal indicative of the highest peak received from said automatic gain control means;
   said comparator circuit means produces a signal to a second peak detector means at a time when said electronic surveillance circuit means cannot resonate said antenna means so that said second peak detector receives a signal from said automatic gain control means;
   said second peak detector means producing an output signal indicative of the highest peak received from said automatic gain control means;
   comparator means for comparing the output signals from said first and second peak detectors and generating a signal depending on the presence or absence of said electronic circuit means in proximity to said antenna means; and
   control circuit means connected to the output of said comparator means for enabling or disabling the use of said electronic information reproducing device in said electronic drive means depending on the presence or absence of said electronic surveillance circuit means, in proximity to said antenna means.

9. The security system of claim 8 wherein:
   said control circuit contains integrating filter means for sampling more than one triangular wave comparison in order to verify the presence of a valid signal from the presence of an electronic surveillance circuit in proximity to said antenna means of said electronic circuit means.

10. The securiy system of claim 9 wherein:
    said electronic surveillance circuit means is resonant as an inductor at about 8 MHz.

11. The security system of claim 10 wherein:
the frequency modulated oscillator means produces a range of frequencies from about 2 MHz to 10 MHz.

12. The security system of claim 11 wherein:
said triangular wave generator is operated at about 2 kHz.

13. A method for providing a security system using an electronic surveillance tag which is readily detected by an electronic circuit for an electronic information reproducing device comprising:
providing an electronic information reproducing device located within a housing;
attaching an electronic surveillance tag capable of producing a detectable electric signal to an inner surface of said housing during the manufacture of said electronic information reproducing device;
sealing said housing after said attachment of said electronic surveillance tag so that said housing may not be opened without detection;
locating said electronic surveillance tag so that said electronic surveillance tag is not visible from outside said housing;
providing an electronic drive means for obtaining information from said electronic information reproducing device;
providing said electronic drive means with an electronic circuit to detect the presence or absence of said electronic surveillance tag;
inserting said housing into said electronic drive means;
said electronic circuit being responsive to the presence or absence of said electronic surveillance tag; and
generating a signal to enable or disable the use of said electronic information reproducing device in said electronic drive means depending on the presence or absence of said electronic surveillance tag.

14. A method as in claim 13 and further comprising:
attaching said electronic surveillance tag to the inner surface of a jacket for a floppy disk prior to the folding and sealing thereof.

15. A method as in claim 13 and further comprising:
attaching said electronic surveillance tag to the inner surface of a portion of a tape cartridge prior to the sealing thereof.

* * * * *

UNITED STATES PATENT AND TRADEMARK OFFICE
CERTIFICATE OF CORRECTION

PATENT NO.  : 4,794,470
DATED       : December 27, 1988
INVENTOR(S) : James H. Lauffenburger; George F. Denehy; Andre Novickis It is certified that error appears in the above-identified patent and that said Letters Patent is hereby corrected as shown below:

Column 6, line 61,   cancel "indicate" and insert therefor --indicated--

Column 7, line 58,   after "said" insert --housing and said electronic information reproducing device--

Signed and Sealed this

Thirtieth Day of May, 1989

Attest:

DONALD J. QUIGG

Attesting Officer

Commissioner of Patents and Trademarks